April 26, 1938.　　　　H. J. CRINER　　　　2,115,572
APPARATUS FOR TWISTING ROLLS OF DOUGH
Filed Nov. 18, 1935
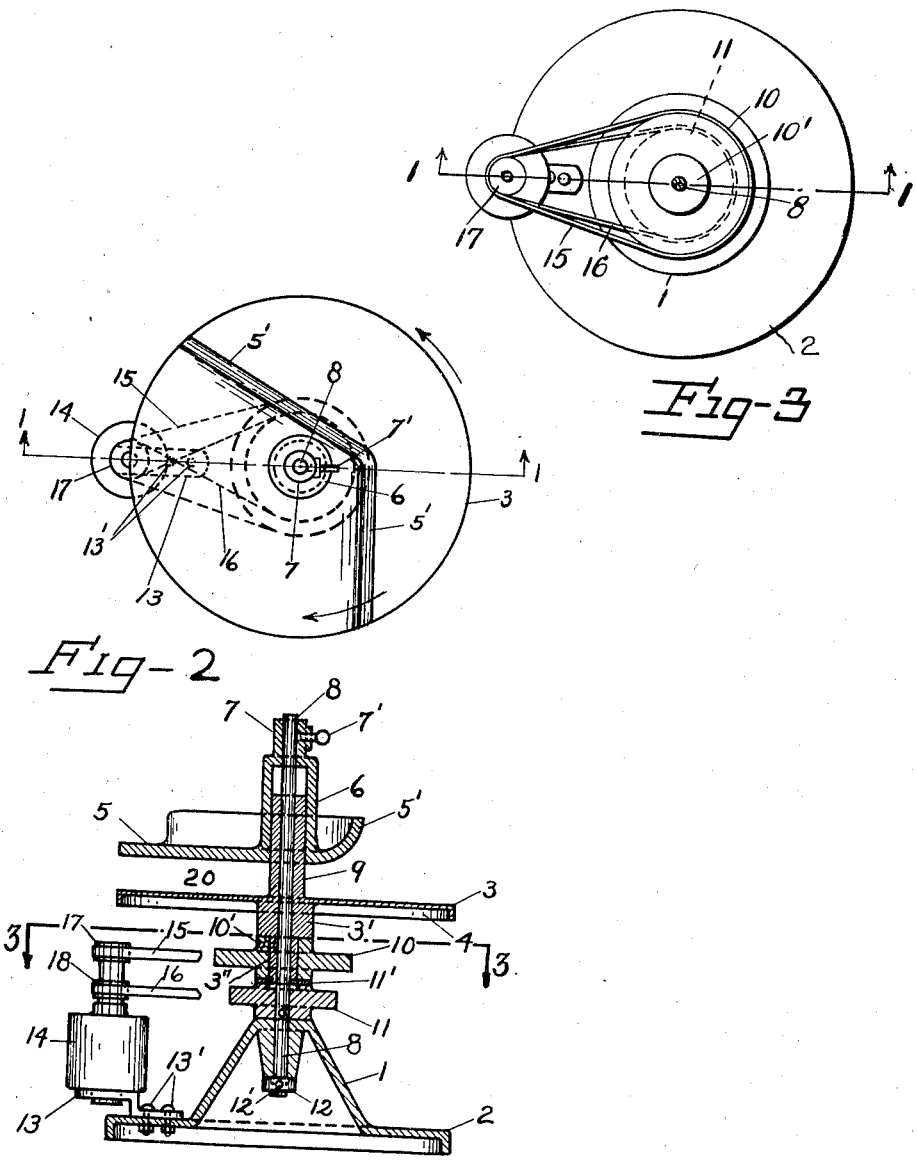

Patented Apr. 26, 1938

2,115,572

UNITED STATES PATENT OFFICE 2,115,572

APPARATUS FOR TWISTING ROLLS OF DOUGH

Harry J. Criner, Davenport, Iowa, assignor of one-half to A. G. Bush, Davenport, Iowa Application November 18, 1935, Serial No. 50,427

2 Claims. (Cl. 107—8)

My invention relates to dough twisting machines.

The objects of my invention are to provide an improved apparatus for twisting or braiding together two or more rolls of dough molded in such form that when twisted together they will form a loaf suitable for baking as a unit, and to provide apparatus mounting two spaced plates adapted to cause a twisting motion of one or more rolls of dough placed between them when rotated at varying speeds or in different directions or when one of the plates is rotated and the other one held stationary.

Another object of my invention is to provide a simple, inexpensive machine of the character described which will be rapid and efficient in operation. Other objects will appear from the specifications.

I attain these objects by the means illustrated in the accompanying drawing, in which,—

Figure 1 is an elevation of my machine showing the motor in full, and the base and twisting apparatus in section on the line 1—1, of Figure 2;

Figure 2 is a plan view of my machine.

Figure 3 shows a sectional detail on the line 3—3 of Figure 1, but modified by showing the belt, 16, uncrossed instead of crossed as in Figure 2.

Similar numerals refer to similar parts throughout the two views.

My apparatus includes a hollow base, 2, with an upwardly extending hub, 1, formed integral therewith. A shaft, 8, is revolvably mounted in the hub, 1, at the center thereof and extends upwardly the full height of the machine. Upon the shaft, 8, is rigidly mounted a pulley, 11, keyed to the shaft, 8, or rigidly secured thereto by any desired means, and a washer or detent, 12, may be secured to the lower end of the shaft, 8, by a set screw, 12'.

A spacer, 11', is mounted upon the shaft, 8. A horizontal circular disc or plate, 3, preferably formed with an integral flange, 4, at the outer edge thereof, is revolvably mounted upon the shaft, 8, with an integral hub, 3', extending downwardly therefrom and this hub is formed with a tubular extension, 3''. Upon the tubular extension, 3'', an additional pulley, 10, is mounted, which may be secured to the hub extension, 3'', by a press-fit or by a key, 10', or other suitable means. The pulley, 10, and the extension, 3'', of the hub, 3', rest upon the spacer, 11'. This spacer, 11', may be either an annular plate of suitable bearing material or it may be a suitable ball bearing.

The plate, 3, has an upwardly extending column, 9, formed integral therewith at the center of the plate and the column, 9, has a central bore extending through it through which the shaft, 8, passes.

An upper horizontal plate, 5, is formed with an upwardly extending tube, 6, formed integral therewith, which is revolvably mounted upon the column, 9, so as to revolve freely around it. The tube, 6, is formed with an upward extension, 7, bored out to fit closely upon the upper end of the shaft, 8, and a set screw, 7', is mounted in the extension, 7, by which the extension, 7, can be locked to the shaft, 8, at various relative heights, thus providing for the spacing of the plates, 3 and 5.

The pulleys, 10 and 11, are driven by belts, 15 and 16, which in turn are driven by belt pulleys, 17 and 18, mounted upon the shaft of the motor, 14, which may be mounted upon a suitable bracket, 13, united to the base, 2, by bolts or set screws, 13', or other suitable means.

The pulleys, 10 and 11, may be made of different diameters so as to cause the plates, 3 and 5, to revolve at different speeds. The belts may run in the same direction so as to cause the plates, 3 and 5, to rotate in the same direction, or one of the belts may be crossed as shown in Figure 2 so that the plates, 3 and 5, will be driven in opposite directions.

The upper plate, 5, may be circular but is preferably made with one side cut away and upturned as at 5' to permit two or three assembled rolls of dough of the desired size to be dropped onto the lower plate, 3, either manually or by mechanical means as desired.

The plates, 3 and 5, are so spaced that when a single roll of dough is fed onto the plate, 3, it will contact with the upper face of the plate, 3, and with the lower face of the plate, 5. The lower plate, 3, may be floured or an excess of flour may be placed upon the roll of dough so as to prevent sticking. As the plates rotate, it is obvious that the roll of dough will be rolled between the plates and as the outer edges of the plates necessarily travel at considerably greater speed than the central portion thereof a twisting action will result and the roll of dough will be uniformly twisted throughout its whole length.

The extent of the twist may be varied by varying the relative speed and direction of rotation of the two plates, it being obvious that with the plates turning in opposite directions, a large degree of twist will be given to the roll, but if the plates are turning in the same direction at different speeds, a very small degree of twist will be given to the roll.

Likewise, if the upper plate be held in stationary position, it will produce a much smaller degree of twist than if the plates are rotated in opposite directions.

It has been found desirable to twist loaves of bread in this way because the loaves so twisted are closer grained and will not dry out so rapidly as otherwise. Likewise, the twisting of two or more rolls of dough together has given a pleasing appearance to the loaf and a larger percentage of crust, which has been found desirable from a marketing standpoint.

In Figure 1, the relative size of the pulleys, 10 and 11, is such that the plate, 5, will rotate more rapidly than the plate 3, but these pulleys may be made of uniform size or either one may be the larger as desired for any particular case.

When desired, the lower belt, 16, may be removed from the pulley, 11, thus allowing the shaft, 8, and plate, 5, to stand idle while the plate, 3, rotates.

The upper plate, 5, is cut away on one side so as to permit the rolls of dough to be manually or mechanically placed upon the plate, 3, and manually removed therefrom after being rolled around the full length of the plate, 5.

In case two or three rolls of dough are desired to be intertwisted, the operator will assemble them together and may give them an initial twist manually if desired. He will then feed them to the machine where the relative movement of the plates will twist them together as described.

The twisted rolls may be removed from the plate, 3, manually or by any desired mechanical means.

It is obvious that various forms of discharge apparatus may be utilized to receive the twisted rolls after the twisting thereof is completed.

In the operation of my device, a roll, or a plurality of rolls of dough assembled together, is placed upon the uncovered portion of the plate, 3, in such a position that the long axis of the rolls extends in a radial line outwardly from the column, 9. The motor having been started, the lower plate, 3, is rotated and carries the rolls around into contact with the upper plate, 5, and causes the rolls to roll along between the two plates. The rolls will then be twisted together as their outer ends are necessarily being rotated around the axis of the roll at a more rapid rate than their inner ends.

I do not limit my claims to the precise form shown in the drawing, as it is obvious that various modifications thereof may be made without departing from the spirit of my invention.

I claim:

1. A dough twisting machine comprising a base, a pair of flat-faced, parallel, twisting members mounted thereon in spaced relation, and means for rotating one of said twisting members relatively to the other.

2. A dough twisting machine comprising a base, a pair of coaxial flat-faced, parallel, twisting members mounted thereon in spaced relation, and means for rotating one of said twisting members relatively to the other.

HARRY J. CRINER.